United States Patent Office 3,310,463
Patented Mar. 21, 1967

3,310,463
INSECTICIDAL MATERIALS
Leslie Owen Hopkins and Donald Roderick Maciver, both of Nakuru, Kenya, assignors to The Pyrethrum Board of Kenya, Nakuru, Kenya, a body corporate of Kenya
No Drawing. Filed July 11, 1966, Ser. No. 564,022
Claims priority, application Great Britain, June 9, 1964, 23,950/64
18 Claims. (Cl. 167—24)

This application is a continuation-in-part of Serial No. 460,529, filed June 1, 1965, and now abandoned.

This invention relates to insecticidal materials and more especially to insecticidal compositions of low toxicity to warm-blooded animals.

One of the most important groups of insecticidal materials at the present time is that based upon the derivatives of the chrysanthemumic acids; these materials are of both natural and synthetic origin. The naturally occurring materials are essentially the extracts obtained by the action of various solvents such as petroleum ethers, lower alkanols and ethylene dichloride upon the flowers of *Chrysanthemum cinerarifolium*. These extracts are processed in a number of different ways to yield products varying somewhat in their insecticidal activity. However all such materials of natural origin contain one or more esters which have been respectively designated Pyrethrins I and II and Cinerins I and II. Such materials of natural origin are herein designated pyrethrins. It is known that the insecticidal activity of pyrethrins can be enhanced by admixture with certain substances which themselves have little insecticidal activity but which behave as synergists. One of the best known synergists is piperonyl butoxide (an unsymmetrical di-ether of diethyleneglycol): other compounds have also been reported containing the methylenedioxyphenyl group which have some degree of synergistic activity.

To be acceptable a synergist for the insecticidal-pyrethrum type esters should have low toxicity towards warm-blooded animals, should be readily soluble in inexpensive solvents in which the insecticidal compounds are also soluble, should be effective in knocking down and killing in combination with insecticidal-pyrethrum type compounds a wide range of insects, should be stable on storage, of inoffensive odour and non-irritant towards man and other warm-blooded animals.

It has been found that certain acetals of piperonaldehyde fulfill these requirements.

Accordingly the present invention provides an insecticidal composition comprising a piperonyl acetal having the formula

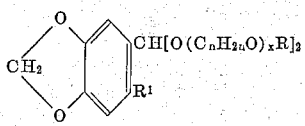

in which R is an alkyl group having one to six carbon atoms, $R^1$ is a hydrogen atom or an alkyl or alkenyl group having not more than six carbon atoms, $n$ is 2 or 3 and $x$ is 1, 2 or 3, together with an insecticidal ester of cyclopropane monocarboxylic acid which acid has the formula

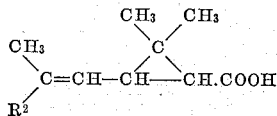

in which $R^2$ is a methyl or methoxy carbonyl group. Those acetals in which $x$ is 2 have been found to be particularly useful.

Whilst the simple acyclic acetals of piperonal and safrole such as the ethyl and isobutyl acetals have been found to have but weak synergistic activity towards pyrethrins, the compounds used in accordance with the present invention have been found to possess very marked synergism. In contrast with the acetals based upon piperonyl alcohol and acetaldehyde or formaldehyde they have excellent stability upon storage. Moreover, when compared with the cyclic acetals produced from piperonaldehyde and glycols they also have much better stability and a much more favourable solubility in aromatic hydrocarbon-free aliphatic hydrocarbons. The need for stabilising yet other acetals which have been proposed for use as synergists has been recognised by the proposal to incorporate stabilising agents therewith.

The acetals used in accordance with the present invention are oils at normal temperatures and have very high flash points.

When the substituent $R^1$ in the first formula is a hydrogen atom the acetals which may be used in accordance with the present invention include piperonyl bis (2-[n-butoxy]ethyl) acetal, piperonyl bis(2-ethoxyethyl) acetal, piperonyl bis(2-[2'-n-butoxyethoxy]ethyl) acetal, piperonyl bis(2-[2'-ethoxyethoxy]ethyl)acetal, piperonylbis(3-[3'-n-propoxy-n-propoxy]propyl) acetal, piperonyl bis(3-n - propoxy - n - propyl acetal, piperonyl bis(3-[3'-(n-butoxy)-n-propoxy]propyl)acetal and piperonyl bis(2 - [2'-{2''-n-butoxyethoxy}ethoxy]ethyl) acetal.

The substituent $R^1$ may also be an alkyl group having 1 to 6 carbon atoms, such as a methyl, ethyl, n-propyl or n-butyl group, or an alkenyl group having 2 to 6 carbon atoms such as an ethenyl, propenyl or butenyl group. Of particular interest as the aldehydes from which the acetals are derived are safrole (6-allylpiperonaldehyde) and dihydrosafrole (6-n-propylpiperonaldehyde).

The acetals which may be used in which $R^1$ is an alkyl or alkenyl group include safrole and dihydrosafrole bis (2-[n-butoxy]-ethyl)acetals, safrole and dihydrosafrole bis(2-[2'-n-butoxyethoxy]-ethyl) acetals, dihydrosafrole bis(2 - ethoxyethyl) acetal, safrole bis(2 - [2' - ethoxyethoxy]-ethyl) acetal, dihydrosafrole bis(3-[3'-n-propoxy-n-propoxy]-propyl)-acetal, safrole bis(3-n-propoxy-n-propyl)acetal, dihydrosafrole bis(3 - [3'-(n-butoxy)-n-propoxy - n - propyl)acetal and safrole bis (2 - [2' - {2''-n-butoxyethoxy}-ethoxy]ethyl) acetal.

The piperonyl acetals having the above general formula may be produced by reacting a piperonylidene dihalide having the general formula

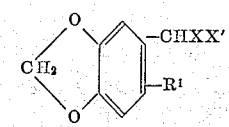

in which $R^1$ is as above defined, X and X' are halogen atoms and which may be like or unlike, with two stoichiometric proportions of an alkali metal derivative of an etherified alkanol having the formula

$$MO(C_nH_{2n}O)_xR$$

in which R, $n$ and $x$ are as above defined and M is an alkali metal. It is preferred that X and X' be chlorine atoms. The reaction is conveniently carried out employing a solution of the alkali metal derivative in an excess of the etherified alkanol employed.

The alkali metal derivative of the etherified alkanol employed is preferably a lithium, sodium or potassium derivative. These derivatives may be prepared, for example, by reaction with an alkali metal hydroxide and removal of the water concomitantly produced. The piperonylidene dihalide having the group $R^1$, preferably the dichloride, may then be slowly added to the solution of alkali metal derivative. As the reaction proceeds the corresponding alkali metal halide separates from the reaction mixture. When the reaction slackens the reaction mixture may be heated or allowed to stand in order that it shall proceed to substantial completion. The alkali metal halide is then separated from the remainder of the reaction mixture in any convenient way, e.g., by solution in water and separation of the aqueous layer. The organic phase is then worked up in any suitable manner. The products are high boiling liquids which can be distilled at low pressures and are, in general, pale yellow oils with a bland odour. This process minimises the formation of tarry materials.

To prepare the insecticidal compositions of the invention the piperonyl acetals having the formula given above may be admixed in any desired proportions with any one or more of the aforesaid natural or synthetic insecticidal pyrethrum type esters. Thus from 99-1% by weight of acetal or of a mixture of acetals may be admixed with from 1-99% by weight of pyrethrum type ester or esters. It is preferred that there be a major proportion by weight of acetal or acetals, e.g., 99-60% by weight thereof, and a minor proportion of pyrethrum type ester or esters, e.g., 1-40% by weight thereof. Preferred proportions are 95-70% by weight of acetal or acetals and 5-30% by weight of pyrethrin type ester or esters.

The compositions may be produced as concentrates as just indicated or may be dissolved in a suitable volatile innocuous solvent therefor, such as a readily or moderately volatile petroleum fraction free from aromatic hydrocarbons. The solvent may constitute a major or a minor part of the total composition depending upon the intended use thereof but does not affect the proportions in which the acetals and insecticidal esters are present.

The insecticidal ester or esters may be of natural or synthetic origin. The naturally occurring pyrethrins are insecticidal esters of cyclopropane monocarboxylic acids which acids have the formula

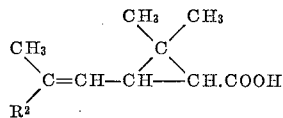

in which $R^2$ is a methyl or methoxy carbonyl group. The esterifying alcohols are cyclopentenone-4-ols having in the 2-position a pentadienyl group or a butenyl group. The synthetic insecticidal esters have similar activity to the naturally occurring pyrethrins and are derived from the same cyclopropane monocarboxylic acids. One important group are those esterified with cyclopentenone-4-ols having in the 2-position an allyl group or a cyclopentenyl group.

All the insecticidal esters so far discussed correspond with the formula

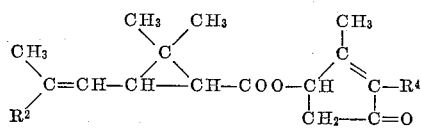

in which $R^4$ is an acyclic or alicyclic ethylenically unsaturated hydrocarbon group having up to 7 carbon atoms and $R^2$ is as above defined. In still further examples of such insecticidal esters the group $R^4$ may be a furfuryl group or a Δ-2-cyclopentenyl group.

Another important group of such insecticidal esters are those in which the esterifying alcohols are nuclear substituted benzyl alcohols, especially those containing lower alkyl groups in the 2- and/or 4-position such as 2.4-dimethyl-benzyl alcohol. Such benzyl alcohols have the general formula

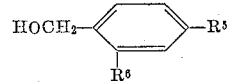

in which $R^5$ and $R^6$ are lower alkyl groups. Other insecticidal esters are obtained by esterification of the cyclopropane monocarboxylic acids with N-methylol derivatives of cycli imides having the formula

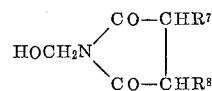

in which each of $R^7$ and $R^8$ is a hydrogen atom or the two groups together with the carbon atoms to which they are attached form a benzene ring. An example of such a compound is N-methylolphthalimide.

The insecticidal esters are, in general, mixtures of optically active isomerides: for the present purpose these can be used separately or in admixture. The naturally occurring pyrethrins may be purified in various ways such as by flash distillation in the presence of a codistillant at very low pressures or by selective solvent extraction and will usually contain small amounts of impurities, such as isopyrethrins, depending upon the particular processing adopted.

The piperonyl acetals present in the compositions of the present invention have been found to have low toxicity to warm blooded animals and to man thus making their use safe under the conditions normally encountered in use. The acetals are readily soluble in aliphatic hydrocarbons which are free from aromatic hydrocarbons, such as petroleum ethers.

As will be apparent from the tests reported hereinatfer the acetals used in accordance with this invention are very effective synergists for the natural and synthetic insecticidal esters of the chrysanthemumic acids. The compositions are particularly effective against *Musca domestica* L, combining rapid knockdown with high lethal activity. The compositions are also very effective against mosquitoes including the malaria-carrying varieties of the latter.

The acetals used in accordance with the invention are stable materials under normal conditions of storage. The acetals have two like substituents upon the carbon atom which participates in acetal formation and, in consequence, they cannot undergo disproportionation in storage with consequent loss of activity. The hitherto known acetals based upon piperonyl alcohol undergo disproportionation and the use of stabilisers has been recommended in order to minimise this tendency.

An extremely important advantage of the compositions of this invention is their non-irritant action upon human mucous membrane. It is known that compositions synergised with certain other well-known synergists, including the so-called piperonyl butoxide, when present in the atmosphere produce an irritation upon human mucous membrane. This is sufficiently severe with some persons to make it necessary for them to transfer to an area free from the source of irritation. Comparative tests have shown that the compositions of the present invention are markedly less irritant towards the human mucous membrane than the prior art compositions.

The following examples illustrate the nature of the invention:

Example I

A solution of the sodium alcoholate of 2-n-butoxyethanol was prepared as follows. The ethanol was first treated with sodium sulphite in order to remove any peroxides present and redistilled under reduced pressure. Sodium hydroxide (11.72 parts) were then added to the purified 2-n-butoxyethanol (51.75 parts) and the whole warmed on a boiling water bath until all the sodium hydroxide was dissolved. Benzene (50 parts) was then added and the whole refluxed in an apparatus fitted with a Dean and Starke trap to enable the removal of water in the condensed benzene-water azeotrope. When no more water was evolved, the reaction mixture was considered to be substantially anhydrous; the benzene was then removed by distillation in vacuum. The resulting solution of sodium 2-n-butoxyethoxide in 2-n-butoxyethanol was cooled and piperonylidene dichloride (27.33 parts) was added slowly with shaking. The reaction mixture was then set aside overnight and the following day, heated for seven hours on a boiling water bath. The precipitated sodium chloride formed a mass on the bottom of the reaction vessel. The reaction mixture was then removed from the water bath and cooled to room temperature. Water (200 parts) was then added and the reaction mixture shaken and allowed to separate into two layers. The lower aqueous layer was discarded and isohexane (100 parts) added to the upper layer which was then washed with water (100 parts). The lower aqueous layer was next discarded and the upper organic layer dried over anhydrous sodium sulphate. The isohexane was then removed from the dried organic layer by distillation on a boiling water bath and the remaining residue submitted to fractional distillation under high vacuum. The fraction boiling at between 160 and 190° C. under a pressure of $2\times10^{-3}$ mm. of mercury was collected and redistilled. The product, piperonyl bis(2-[n-butoxy]ethyl)acetal, was a very pale yellow oil with a bland odour which was then tested for synergistic activity as follows:

Adult houseflies *Musca domestica* Lab. II Strain 4–5 days old were introduced into a Kearns and March spray test chamber and sprayed with a solution (0.4 ml.) containing 0.10% by weight of the oil prepared above together with 0.02% by weight of pyrethrins dissolved in a highly de-aromatised mineral oil, Shellsol T. The knockdown flies were then removed, provided with food and water and the percentage kill after 24 hours determined. A similar determination using a higher concentration of pyrethrum viz. 0.1% by weight in the same solvent but without the acetal prepared above was also carried out and the percentage kill after 24 hours also determined. The tests showed a high degree of synergism viz. 52% mortality of male flies subjected to the solution containing the synergistic oil compared with 24% for the five times more concentrated pyrethrum solution without any addition of the acetal. In order to establish if the synergist was toxic per se a control spraying with acetal but without pyrethrins was also carried out. The result showed no significant kill, hence the increased kill was due to true synergism of the pyrethrins.

*Example II*

A similar procedure to that used in Example I was adopted using 2-ethoxyethanol (40 parts) in place of the butoxyethanol, the other reactants being used in the same amounts as before. On distillation of the crude product under high vacuum, the fraction boiling at 170–175° C. at a pressure of $2\times10^{-3}$ mm. of mercury was collected. The product, piperonyl bis(2-ethoxyethyl)acetal was a pale yellow oil of bland odour which was then tested for synergistic activity in a similar manner to the product obtained in Example I. The tests showed a high degree of synergism viz. 24% kill of male flies compared with 24% for the five times more concentrated solution of pyrethrins without addition of the acetal. A similar control determination of the inherent toxicity of the prepared oil to that carried out in Example I showed it to be without significant toxicity thus indicating true synergistic action.

*Example III*

A product having exceptionally high synergistic activity was prepared using a procedure similar to Example I. Instead of 2-n-butoxyethanol, 2-(2'-n-butoxyethoxy)ethanol (129.6 parts) and a somewhat greater amount of sodium hydroxide (16 parts) was employed, the amount of piperonylidene chloride remaining unchanged. On distillation of the crude product under high vacuum, the fraction boiling at 190–210° C. at $2\times10^{-3}$ mm. of mercury was collected. The product, piperonyl bis(2-[2'-n-butoxyethoxy]ethyl) acetal which was a pale yellow oil of bland odour was then tested for synergistic activity in a similar manner to the product of Example I. The tests showed an exceptionally high degree of synergism viz. 83% kill of male flies compared with 24% for the five times more concentrated pyrethrins solution without addition of the prepared oil. A similar determination of the inherent toxicity of the prepared oil carried out as described in Example I showed the acetal to be without significant toxicity thus indicating a true synergistic action on pyrethrins.

*Example IV*

A similar procedure to that used in Example I was adopted using 2-(2'-ethoxyethoxy)ethanol (120 parts) in place of butoxy-ethanol, and sodium hydroxide (16 parts), the other materials being used in the same amounts as before. On distillation of the crude product under high vacuum, the fraction boiling at 175 to 180° C. at a pressure of $2\times10^{-3}$ mm. of mercury was collected. The product, piperonyl bis(2-[2'-ethoxyethoxy]ethyl) acetal was a pale yellow oil of bland odour which was tested for synergistic activity in a similar manner to the product obtained in Example I. The tests showed a high degree of synergism viz. a 71% kill of male flies compared with 24% for a five times more concentrated solution of pyrethrins without addition of the prepared acetal. A similar determination of the inherent toxicity showed the acetal to be without significant toxicity thus indicating a true synergistic action on pyrethrins.

*Example V*

Adult houseflies, *Musca domestica* Lab. II Strain 4–5 days old were introduced into a Kearns and March spray test chamber and sprayed with a solution (0.4 ml.) containing 0.10% by weight of piperonyl bis(2-[2'-n-butoxyethoxy]ethyl) acetal together with 0.02% by weight pyrethrins dissolved in a highly dearomatised oil, Shellsol T. The knockdown flies were then removed, provided with food and water and the percentage kill after 24 hours determined. A similar determination using piperonyl butoxide instead of piperonyl bis (2-[2'-n-butoxyethoxy]ethyl acetal was also carried out and the percentage kill after 24 hours determined. The results showed 50% knockdown and 90% knockdown times of 3.5 minutes and 8.6 minutes, respectively, and a kill of 96% for piperonyl bis(2-[2'-n-butoxyethoxy]ethyl) acetal and pyrethrins compared with 50% and 90% knockdown times of 3.8 and 10.0 minutes, respectively, and kill of 97% for piperonyl butoxide and pyrethrins. It will be seen that the knockdown times are lower with the compositions in accordance with the present invention, the overall kill being statistically about the same.

*Example VI*

Proceeding in a similar manner to that described in Example V but using allethrin (0.02%) instead of pyrethrins, the other materials being used in the same proportions, a test showed a time for 50% knockdown of 2.3 minutes and a kill of 91% for a composition containing piperonyl bis(2-[2'-n-butoxyethoxy]ethyl) acetal and allethrin. A similar determination using a higher concentration of allethrin, viz. 0.1% by weight in the same solvent but without the addition of piperonyl bis(2-[2'-n-butoxyethoxy]ethyl) acetal was also carried out and the percentage kill after 24 hours also determined. The results showed a 34% kill for the five times more concentrated allethrin solution without any addition of acetal. There is thus true synergistic action between the acetal and allethrin.

Example VII

Adult houseflies, *Musca domestica* Lab. II Strain, 4–5 days old, were divided at random into two equal groups. One group was tested with three concentrations of pyrethrins containing piperonyl bis(2-[2'-n-butoxyethoxy]ethyl) acetal in the ratio of 1:5 weight/weight and the other group tested similarly but using piperonyl butoxide at the same 1:5 ratio in place of piperonyl bis(2-[2-n-butoxyethoxy]ethyl acetal. To compensate for the known marked difference in resistance between male and female flies, the female flies received 0.2 microlitre of pyrethrins solution whilst the male flies only received 0.1 microlitre. The treated flies, the sexes being kept apart, were kept in closed jars with access to a 5% sucrose solution for 24 hours at 28° C. when the percentage mortalities were determined. The results are tabulated below:

PYRETHRINS AND PIPERONYL BIS(2-[2'-n-BUTOXYETHOXY]ETHYL) ACETAL

|  | Percent Concentration of Pyrethrins in test solution | Percent Kill | $LD_{50}$ |
|---|---|---|---|
| Male Flies | 0.030 | 6 | 0.0531% pyrethrins. |
|  | 0.045 | 34 |  |
|  | 0.060 | 63 |  |
| Female Flies | 0.030 | 17 | 0.0531% pyrethrins. |
|  | 0.045 | 35 |  |
|  | 0.060 | 62 |  |

PYRETHRINS AND PIPERONYL BUTOXIDE

| Male Flies | 0.030 | 5 | 0.0557% pyrethrins. |
|---|---|---|---|
|  | 0.045 | 21 |  |
|  | 0.060 | 59 |  |
| Female Flies | 0.030 | 5 | 0.0569% pyrethrins. |
|  | 0.045 | 31 |  |
|  | 0.060 | 50 |  |

It will be seen that the average concentration, determined statistically, of pyrethrins in the synergised compositions to provide a lethal dose for 50% of the flies, over the range of concentrations tested, is 5–7% greater for the compositions synergised with piperonyl butoxide than for those synergised with piperonyl bis(2-[2'-n-butoxyethoxy]ethyl) acetal.

Example VIII

A solution containing 0.05% pyrethrins and 0.40% piperonyl bis(2-[2'-n-butoxyethoxy]ethyl acetal by weight was tested by the official C.S.M.A. cockroach spray test method on adult males of the German cockroach, *Blattella germanica* (Linn), using a test dosage of 0.5 ml. A similar solution containing 0.05% pyrethrins and 0.40% piperonyl butoxide by weight was also tested. The results are summarised below:

| Sample | Average Percent Dead and Moribund | |
|---|---|---|
|  | 24 hours | 48 hours |
| 0.05% pyrethrins, 0.40% piperonyl bis (2-[2'-n-butoxyethoxy]ethyl) acetal | 29 | 32 |
| 0.05% pyrethrins, 0.40% piperonyl butoxide | 16 | 21 |

It will be seen that the solution synergised with piperonyl bis(2-[2'-n-butoxyethoxy]ethyl)acetal is a much more effective one.

Example IX

A solution of the sodium alcoholate of 2-n-butoxyethoxyethanol was prepared in the manner described in Example I substituting a molar equivalent of 2-n-butoxyethoxyethanol for the 2-n-butoxyethanol used in that example.

The resulting solution of sodium 2-n-butoxyethoxyethoxide was cooled and 32.8 parts of 6-propyl piperonylidene dichloride added slowly with shaking. The reaction mixture was allowed to stand overnight and then heated for 7 hours on a water-bath. A quantity of sodium chloride separated. The reaction mixture was then cooled to room temperature and 200 parts of water added. Two layers separated, the lower aqueous layer being discarded. One hundred parts of isohexane was added to the upper layer which was then washed with water (100 parts). The aqueous layer was discarded and the upper, organic layer dried over anhydrous sodium sulphate. Solvent was next removed by distillation on a water bath and the residue submitted to distillation in an Edwards molecular still and thereafter redistilled. The 6-propyl piperonyl bis(2-[2-n-butoxyethoxy]ethyl) acetal was obtained as a pale yellow oil, boiling point 155° C./0.02 mm. of mercury. The acetal is completely soluble in odourless kerosene.

The acetal prepared as described above was submitted to testing using the Peet-Grady test method for large groups (see Soap and Chemical Specialties Blue Book, 1964, pages 223–5). All solutions used were prepared in an odourless kerosene solvent.

| Test Solution | Composition of Test Solution | | |
|---|---|---|---|
|  | Percent w/v Pyrethrins | Percent w/v Acetal | Percent w/v Piperonyl butoxide |
| A | 0.03 | 0.25 |  |
| B | 0.03 |  | 0.25 |
| C |  | 0.25 |  |
| D | 0.03 |  |  |

The following results were obtained

| Test Solution | Average Knockdown Percent Time (minutes) | | | Average Percent Mortality (24 hours) |
|---|---|---|---|---|
|  | 3 | 5 | 10 |  |
| A | 90 | 95 | 99 | 74 |
| B | 90 | 94 | 98 | 77 |
| C | 0 | 0 | 0 | 0 |
| D | 69 | 79 | 90 | 12 |

Example X

Proceeding as described in Example I but using a molar equivalent of 6-allylpiperonaldehyde in place of the 6-propylpiperonaldehyde there was obtained 6-allylpiperonyl bis(2-[2'-n-butoxyethoxy]ethyl) acetal as a pale yellow liquid having a boiling point of 160° C./0.02 mm. of mercury. The product, and that of Example IX were tested for synergistic activity as follows:

Adult houseflies *Musca domestica* Lab. II Strain 4–5 days old were introduced into a Kearns and March spray test chamber and sprayed with a solution (0.4 ml.) containing 0.125% of the acetal under test together with 0.025% by weight of pyrethrins dissolved in a de-aromatised mineral oil. The knockdown flies were then removed, provided with food and water and the percentage kill after 24 hours determined. Control solutions were similarly tested. The results were as follows:

| Test Solution | Composition of Test Solution | | | |
|---|---|---|---|---|
|  | Percent w/w pyrethrins | Percent w/w acetal of Example IX | Percent w/w acetal of Example X | Mineral oil |
| E | 0.025 |  | 0.125 | Remainder. |
| F | 0.025 | 0.125 |  | Do. |
| G |  |  | 0.125 | Do. |
| H |  | 0.125 |  | Do. |
| I | 0.025 |  |  | Do. |

| Solution | Knockdown times (mins.) 50% | Knockdown times (mins.) 90% | Percent Males killed after 24 hours |
|---|---|---|---|
| E | 4.5 | 10.5 | 58.2 |
| F | 5.6 | 14.5 | 55.7 |
| G | | | Nil |
| H | | | Nil |
| I | 7 | 30 | 5 |

These results show that the acetals are not themselves lethal at the concentrations employed, and the solution of pyrethrins alone, only weakly lethal. The high kills obtained with solutions E and F demonstrate the presence of a high degree of synergism and reveal that the acetal of the 6-allyl compound is slightly more potent than the 6-propyl compound as a synergist.

*Example XI*

A similar procedure to that used in Example I was adopted using 1-[2'-(2''-methoxy-1''-methylethoxy)]-2-propanol (162 parts) in place of butoxy-ethanol, and sodium hydroxide (16 parts), the other reactants being used in the same amounts as before. On distillation of the crude product under high vacuum in a 2'' short path molecular still the fraction distilling at a heater temperature of 180° C. at a pressure of 5×10⁻² mm. of mercury was collected. The product piperonyl bis[1-[2'' - (2'-2''-methoxy-1''-methylethoxy)] - 1' - methylethoxy[-2-propyl]acetal was a pale yellow oil of bland odour which was tested for synergistic activity in a similar manner to the product obtained in Example I. The tests showed a high degree of synergism viz. 58% kill of male flies compared with 22% for a five times more concentrated pyrethrins solution without addition of the prepared oil. A similar determination of the inherent toxicity thus indicating a true synergistic action on in Example I showed the acetal to be without significant toxicity thus indicating a true synergistic action on pyrethrins.

*Example XII*

Two aerosols were prepared using the same propellant and the same solvent in the same proportions. One aerosol contained 0.25% by weight of pyrethrins and 1.0% by weight of piperonyl butoxide. The other contained 0.25% by weight of pyrethrins and 1.0% by weight of piperonyl bis(2 - [2' - n-butoxyethoxy]ethyl) acetal (see Example 3). The aerosols were identified by code numbers and were discharged into separate like test chambers in the proportion recommended for knocking down houseflies in an occupied room. Persons were admitted one at a time to one of the test chambers and, after an interval of time sufficient to recover from any irritant effects encountered, then admitted to the other test chamber. When the results were analysed it was found that seven persons (five men and two women) complained of irritation of the mucous membrane after inhaling in the test chamber in which the aerosol containing piperonyl butoxide had been discharged, but none of the seven complained of irritation after inhaling in the test chamber in which the aerosol containing piperonyl bis(2-[2'-n-butoxyethoxy]ethyl) acetal has been discharged. There were no complaints at all of irritation after inhaling in the latter test chamber.

Another series of tests carried out at a location several hundred miles distant from the first location using identical aerosols yielded similar results.

What we claim is:

1. An insecticidal composition comprising from 99 to 1% by weight of a piperonyl acetal having the formula

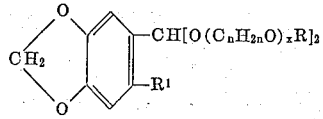

in which R is an alkyl group having 1 to 6 carbon atoms, $R^1$ is selected from the group consisting of H, alkyl and alkenyl having not more than 6 carbon atoms, $n$ is an integer which is greater than 1 but less than 4 and $x$ is a positive integer which is less than 4, and from 1 to 99% by weight of an insecticidal ester of a cyclopropane monocarboxylic acid which ester has the formula

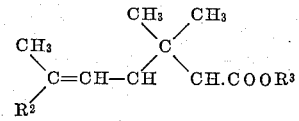

in which $R^2$ is selected from the group consisting of methyl and methoxycarbonyl and $R^3$ is selected from the group having one of the formulae

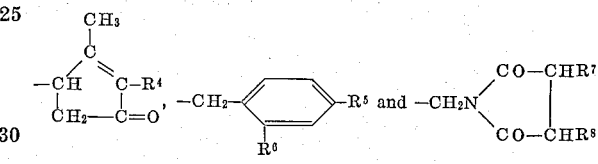

in which $R^4$ is an aliphatic ethylenically unsaturated hydrocarbon group having less than 8 carbon atoms or furfuryl, each of $R^5$ and $R^6$ is a lower alkyl group and each of $R^7$ and $R^8$ is a hydrogen atom or the two groups together with the carbon atoms to which they are attached form a benzene ring.

2. The composition of claim 1 in which said piperonyl acetal is present in a proportion of 99 to 60% by weight and said ester in a proportion of 1 to 40% by weight.

3. The composition of claim 1 in which said piperonyl acetal is piperonyl bis(2-[n-butoxy]ethyl)acetal.

4. The composition of claim 1 in which said piperonyl acetal is piperonyl bis(2-ethoxyethyl)acetal.

5. The composition of claim 1 in which said piperonyl acetal is piperonyl bis(2-[2'-n-butoxyethoxy]ethyl)acetal.

6. The composition of claim 1 in which said piperonyl acetal is piperonyl bis(2-[2'-ethoxyethoxy]ethyl)acetal.

7. The composition of claim 1 in which said piperonyl acetal is 6-propyl piperonyl bis(2-[2'-n-butoxyethoxy]ethyl)acetal.

8. The composition of claim 1 in which said piperonyl acetal is 6-allylpiperonyl bis(2-[2'-n-butoxyethoxy]ethyl)acetal.

9. The composition of claim 1 in which said insecticidal ester is pyrethrins.

10. The composition of claim 9 in which said pyrethrins constitute 5 to 30% by weight of said composition.

11. The composition of claim 9 in which said piperonyl acetal is piperonyl bis(2-[2'-n-butoxyethoxy]ethyl)acetal.

12. The composition of claim 9 in which said piperonyl acetal is 6-allylpiperonyl bis(2-[2'-n-butoxyethoxy]ethyl) acetal.

13. The composition of claim 1 in which said insecticidal ester is

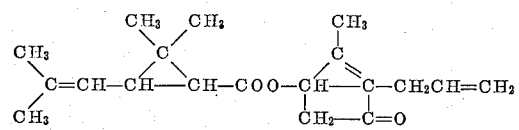

14. The composition of claim 13 in which said piperonyl acetal is piperonyl bis(2-[2'-n-butoxyethoxy]ethyl) acetal.

15. The composition of claim 13 in which said piperonyl acetal is 6-allylpiperonyl bis(2-[2'-n-butoxyethoxy]ethyl)acetal.

16. The composition of claim 1 in which said insecticidal ester is a 2,4-dimethylbenzyl ester of said cyclopropane monocarboxylic acid.

17. The composition of claim 16 in which said piperonyl acetal is piperonyl bis(2-[2'-n-butoxyethoxy]ethyl)acetal.

18. The composition of claim 16 in which said piperonyl acetal is 6-allylpiperonyl bis(2-[2'-n-butoxyethoxy]ethyl)acetal.

References Cited by the Examiner

UNITED STATES PATENTS

| | | | |
|---|---|---|---|
| 2,485,681 | 10/1949 | Wachs | 167—24 |
| 2,857,309 | 10/1958 | Barthel | 167—24 |
| 2,891,889 | 6/1959 | Haynes | 167—24 |
| 3,055,800 | 9/1962 | Willmore | 167—33 |
| 3,186,903 | 6/1965 | Soltes | 167—24 |

ALBERT T. MEYERS, *Primary Examiner.*

STANLEY J. FRIEDMAN, *Assistant Examiner.*